(No Model.)
S. NAYLOR.
POLE CHAIN.
No. 425,577.
Patented Apr. 15, 1890.
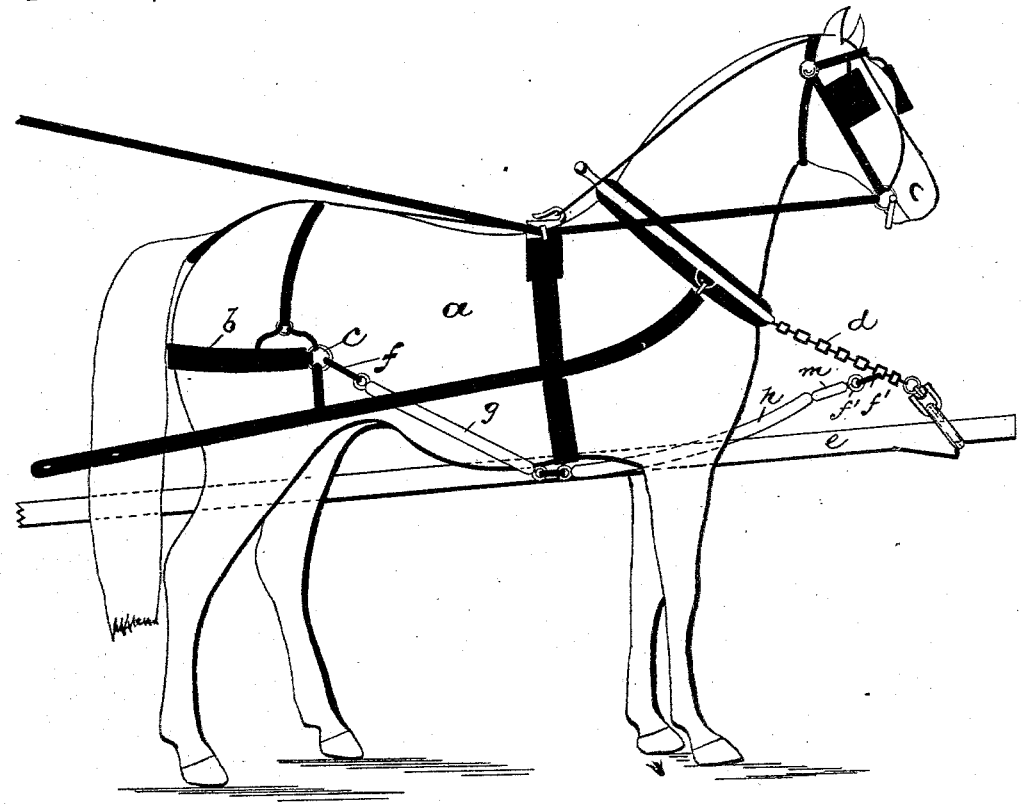
Fig. 1.
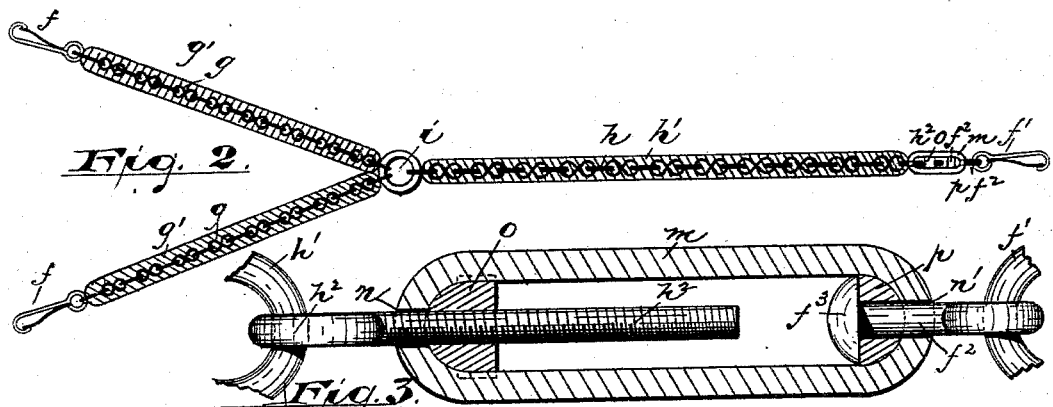
Fig. 2.
Fig. 3.
WITNESSES:
Oscar A. Michel
E. L. Sherman
INVENTOR
Stephen Naylor,
BY Drake & Co. ATTY'S.

United States Patent Office.

STEPHEN NAYLOR, OF NEWARK, NEW JERSEY.

POLE-CHAIN.

SPECIFICATION forming part of Letters Patent No. 425,577, dated April 15, 1890.

Application filed January 8, 1890. Serial No. 336,235. (No model.)

*To all whom it may concern:*

Be it known that I, STEPHEN NAYLOR, a citizen of the United States, residing at Newark, in the county of Essex and State of New Jersey, have invented certain new and useful Improvements in Pole-Chains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple, strong, and efficient draw-back attachment to the harness of horses, (when used in pairs or more with a carriage-pole.)

The invention consists in the improved draw-back attachment and in the combination and arrangement of the parts thereof, substantially as will be hereinafter set forth, and finally embodied in the claim.

Referring to the accompanying drawings, in which like letters of reference indicate corresponding parts in each of the several figures, Figure 1 is a side view of a horse with a carriage-pole, showing my improved draw-back attachment in connection therewith; and Fig. 2 is a plan view of the draw-back detached from the vehicle, &c.; and Fig. 3 is an enlarged view of the adjuster on the end of the draw-back.

In said drawings, $a$ represents a horse as ordinarily harnessed, the breech-strap $b$ being provided with rings $c$ $c$. To the collar is secured one end of the ordinary chain or strap $d$, the other end being secured to a ring or swivel on a carriage-pole $e$ in the usual manner. To the rings $c$ $c$ and the chain $d$ are secured by snaps $f$ $f$ $f'$ my improved draw-back attachment, consisting of parts $g$ $g'$ and $h$ $h'$, all said parts being connected to a ring $i$, as shown in Fig. 2. The ends of the parts $g$ $g'$ being secured, as above stated, in the rings $c$ $c$, the part $h$ $h'$ is then passed under the horse's body and between his fore legs and the outer end secured to the chain or strap $d$, as stated, by a clasp or in any suitable manner, as shown in Fig. 1.

The draw-back attachment combines chain $g$ and $h$, coated with rubber $g'$ and $h'$ or other elastic compound, as clearly shown in Fig. 2.

In Fig. 3 I have shown an enlarged view of an adjuster on the forward end of the draw-back, where it connects with the collar-chain $d$. Said adjuster consists of an oblong link $m$, with central end openings $n$ $n'$. Through the opening $n$ passes the threaded shank of an eyebolt $h^2$, secured to the end of chain $h$. This eyebolt is threaded, as shown in Fig. 3, to receive a threaded nut $u$, secured within the link $m$. Through the opening $n'$ is passed the end of the link $f^2$, connected with snap $f'$ and provided at its inner end with a shoulder or head $f^3$, forming a swivel. Between this shoulder and the end of the link is placed an elastic ball or cushion $p$.

When it is desired to lengthen or shorten the draw-back, the link $m$ is turned in the required direction on the nut $o$, thus causing the threaded portion $h^3$ of the eye bolt to be drawn in and out of the link $m$, according as the link is turned.

The nut $o$ can be dispensed with, when desired, and in such case the opening $n$ in the link can be threaded to receive the threaded end of the eyebolt $h^2$.

The forward end of the draw-back can, when desired, be attached directly to the carriage-pole, instead of to the chain or strap leading from the horse's collar.

In operation, when the draw-back attachment is secured to the harness and collar-chain, as herein described, great force can be exerted to back a carriage or wagon, avoiding the usual great strain upon the horse's collar and the horse's neck resulting from the old devices.

Having thus described my invention, what I claim as new, and desire to secure, is—

In a pole-chain, the combination, with the back-strap, of the two parts $g$, connected at their outer end to the back-strap and having each a covering $g'$, the part $h$, connected to the part $g$ and having a covering $h'$, the bolt $h^2$, connected to the part $h$, and the link $m$, nuts $o$ and $p$, and swivel $f$, all arranged and adapted for the purpose described.

In testimony that I claim the foregoing I have hereunto set my hand this 13th day of December, 1889.

STEPHEN NAYLOR.

Witnesses:
OLIVER DRAKE,
E. L. SHERMAN.